(12) United States Patent
Kanaujia et al.

(10) Patent No.: US 9,990,301 B1
(45) Date of Patent: Jun. 5, 2018

(54) VALUE CACHE IN A COMPUTING SYSTEM

(71) Applicant: Facebook, Inc., Menlo Park, CA (US)

(72) Inventors: Shobhit O. Kanaujia, Santa Clara, CA (US); Kalyan Saladi, Sunnyvale, CA (US); Narsing Vijayrao, Santa Clara, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days. days.

(21) Appl. No.: 15/372,135

(22) Filed: Dec. 7, 2016

(51) Int. Cl.
  *G06F 12/00* (2006.01)
  *G06F 12/0893* (2016.01)
  *G06F 12/0891* (2016.01)
  *G06F 3/06* (2006.01)

(52) U.S. Cl.
  CPC ........ *G06F 12/0893* (2013.01); *G06F 3/0641* (2013.01); *G06F 12/0891* (2013.01); *G06F 2212/60* (2013.01)

(58) Field of Classification Search
  CPC ............. G06F 12/0893; G06F 12/0891; G06F 2212/60; G06F 3/0641
  See application file for complete search history.

(56) References Cited

U.S. PATENT DOCUMENTS

2016/0019232 A1*  1/2016  Lambright ........ G06F 17/30159
                                                  707/692

* cited by examiner

*Primary Examiner* — Shawn X Gu
(74) *Attorney, Agent, or Firm* — FisherBroyles, LLP

(57) ABSTRACT

The disclosure is directed to a cache management system ("system") for storing data in a cache of a computer system in a compact form. The system identifies multiple instances of a candidate value stored in a primary cache and stores those instances as a single value in a value cache. The system stores multiple pointers to the candidate value in the value cache, e.g., as many as the number of occurrences of the candidate value in the primary cache, each of which corresponds to an address in a memory of the computer system storing an instance of the primary cache candidate value. By storing multiple instances of the candidate value as a single instance, the system reduces the cache pollution and the memory bandwidth and facilitates storing more number of distinct values in the primary cache of a given size.

20 Claims, 8 Drawing Sheets

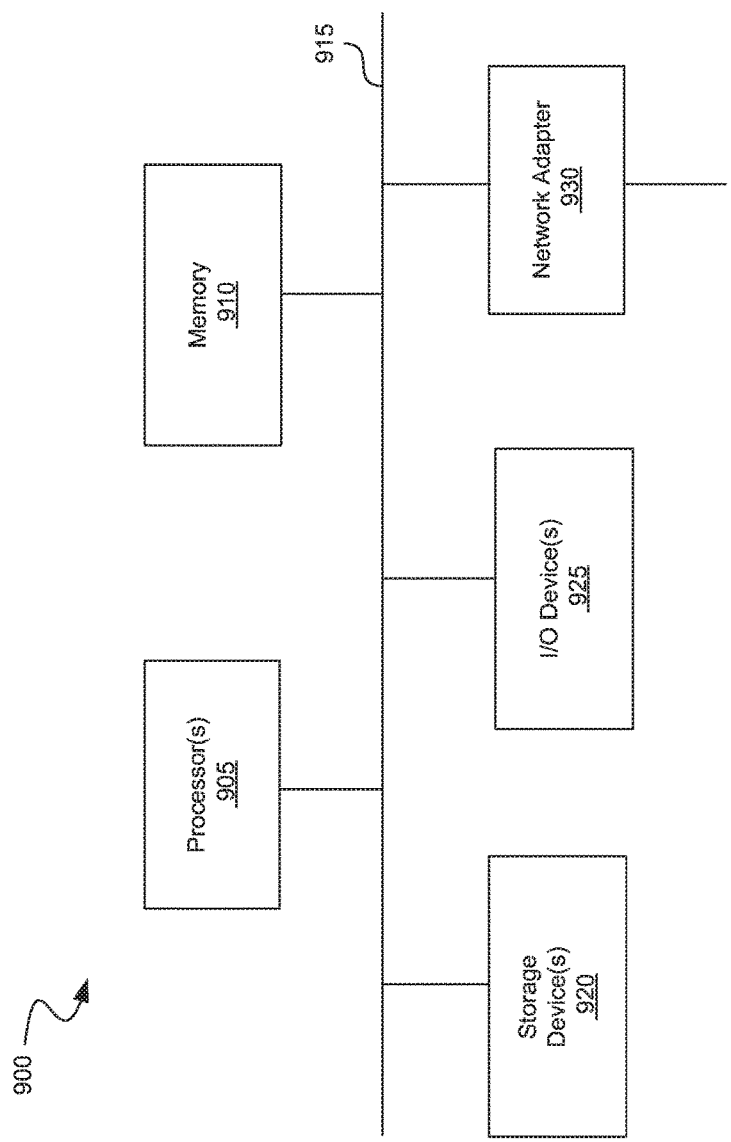

VALUE CACHE IN A COMPUTING SYSTEM

BACKGROUND

Caching is a process in which data is stored in a central processing unit (CPU) cache of a computer to reduce the average cost, e.g., time or other computing resources, to access data from the main memory. The cache is a smaller, faster memory which stores copies of the data from frequently used main memory locations. Cache management is a process that controls movement of data between the cache and the main memory. More the number of cache hits, the lesser is the average cost of accessing the data. The cache hits can be maximized by storing all or most of the data from the memory in the cache. However, cache memory is very expensive and the cost of the cache increases exponentially with the size of the cache. Having a cache that can store all or most of the data from the memory in the cache may not be practical. Accordingly, the cache management processes use various caching policies to selectively store data that is requested more often than not to maximize the cache hits.

Many of the prior cache management processes are inefficient as the number of cache hits is not maximized. For example, prior cache management systems cache data items that are more frequently accessed. At least some of these data items can be duplicates. That is, the cache can store multiple copies of a data item. For example, if a cache management process determines that memory locations, e.g., "address 1" and "address 2," are more frequently accessed and have to be cached, the values of "address 1" and "address 2" are cached regardless of whether those addresses store the same or different values. By storing duplicate values, the amount of cache storage available for storing distinct values is reduced, which can minimize the number cache hits. Further, it can also increase cache pollution and memory bandwidth. These problems are further multiplied in a datacenter scenario where a number of server computing devices are installed for serving data access requests from a number of client computing devices. Having an inefficient cache management process can increase the read and/or write latency of the entire datacenter and/or the average cost, e.g., time or other computing resources, to access the data stored at the datacenter.

BRIEF DESCRIPTION OF THE DRAWINGS

FIG. 9 is a block diagram of a processing system that can implement operations, consistent with various embodiments.

DETAILED DESCRIPTION

Figure 1:
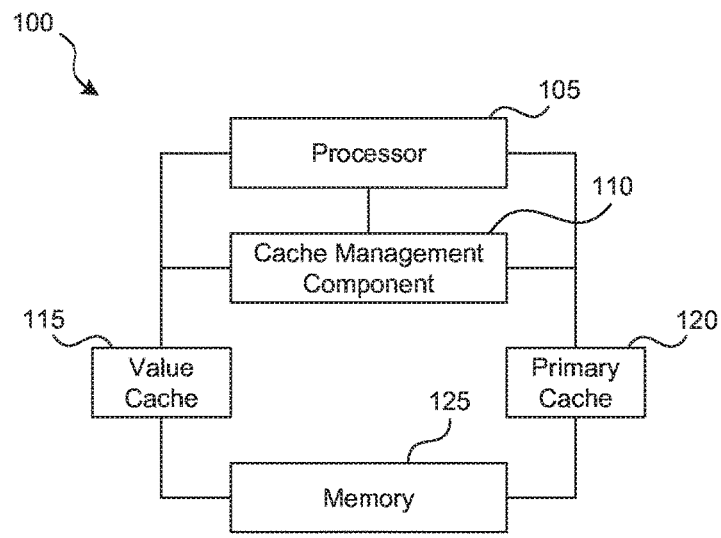
FIG. 1 is a block diagram of an environment in which the disclosed embodiments may be implemented.

Embodiments are directed to a cache management system for storing data in a cache of a computer system in a compact form. The cache management system compresses multiple cache blocks of the primary cache storing the same value into a single cache block storing that value. In one such embodiment, the cache management system identifies multiple instances or occurrences of a candidate value stored in the primary cache and stores those multiple instances of the primary cache candidate value as a single value, thereby making more space available in the primary cache for storing distinct values. By storing multiple instances of the primary cache candidate value as a single instance and making storage space available for storing more number of distinct values, the cache management system reduces the cache pollution and the memory bandwidth. In addition, such compression of data in the cache can minimize the amount of silicon real estate for storing a given amount of data. In other words, the cache management system facilitates storing more values, e.g., distinct values, in the primary cache of a given size.

The cache management system includes a value cache that stores values that occurs multiple times in the primary cache. The cache management system identifies a candidate value in the primary cache that satisfies a specified criterion, e.g., number of occurrences of the candidate value exceeding a specified threshold, for being promoted to the value cache, and then stores the candidate value as a single instance in a value buffer of the value cache. Further, the cache management system also stores multiple pointers to the candidate value in the value cache in which each of the pointers corresponds to an address in a memory of the computer system storing an instance of the candidate value. The cache management can store as many pointers as the number of occurrences of the candidate value in the primary cache. The pointers can be stored in a pointer array of the value cache.

In some embodiments, the value cache has the same hierarchy as the primary cache, e.g., if the primary cache has L1, L2, L3 hierarchy, then the value cache also has the same hierarchy. The cache management system can allocate at least a portion of the primary cache to form the value cache. The value cache and the primary cache can be exclusive to each other, e.g., a value is either stored in the value cache or the primary cache.

When a read request arrives at the computer system for reading a specified value at a specified memory address, the cache management system can execute a read operation at both the value cache and the primary cache, e.g., in parallel. If there is a hit for the specified memory address in the value cache, the specified value is returned from the value cache. If there is a miss in the value cache and a hit in the primary cache, the specified value is returned from the primary cache. If there is a miss in both the value cache and the primary cache, then the specified value is obtained from the memory. In some embodiments, the specified value may be written to the primary cache after being obtained from the memory depending on caching policies used, e.g., a cache policy for storing most recently used value.

When a write request arrives at the computer system for updating or writing a specified value to a specified memory address, the cache management system can determine if there is a hit for the specified address in the value cache (which means the write operation is updating the current value stored at the specified memory address), and if there is a hit, the cache management system can determine if the specified value is different from the current value stored in the cache. If the specified value is different from the current value, the specified memory address is evicted from the value cache and the specified value is written to the memory at the specified memory address. Once the specified value is written to the memory, the specified value may also be written to the primary cache based on the caching policies used, e.g., a cache policy for storing most recently used value. If the specified value is the same as the current value, the specified memory address is added to the value cache if not already existing.

Referring back to determining whether there is a hit for the specified memory address in the value cache, if there is no hit for the specified memory address in the value cache, the cache management system determines if there is a hit in the primary cache. If there is a hit in the primary cache, the current value in the primary cache is updated with the specified value, which can be further pushed to the memory based on cache eviction policies. If there is neither a hit in the primary cache nor the value cache, the specified value is written to the specified memory address in the memory. After writing the specified value to the memory, the specified value can also be written to the primary cache as well based on the caching policies implemented in the computer system. Referring back to updating the primary cache with the specified value, in some embodiments, the cache management system can determine if there are multiple instances of the specified value in the primary cache and if there are multiple instances, determine if the specified value satisfies the criterion for being promoted to the value cache. If the specified value satisfies the criterion for being promoted to the value cache, the specified value is promoted to the value cache and all the instances of the specified value in the primary cache are evicted, thereby making storage space available for storing more number of distinct values.

Turning now to the figures, FIG. 1 is a block diagram of an environment 100 in which the disclosed embodiments may be implemented. The environment 100 includes a computer system 150 in which the disclosed embodiments can be implemented. The computer system 150 can be any type of computing device in which a cache can be implemented, e.g., a server computing device, a desktop, a laptop, a tablet PC, a smartphone, and a wearable computing device. The computer system 150 includes a processor 105 that executes various operations of the computer system 150, e.g., read and/or write operations. The computer system 150 includes a memory 125, which can store data. The data can be received from another entity, e.g., another computer system (not illustrated), retrieved from a secondary storage system of the computer system 150, e.g., a disk drive (not illustrated) and/or generated by the computer system 150. The memory 125 can be a random access memory (RAM) or a variation thereof.

Figure 2:
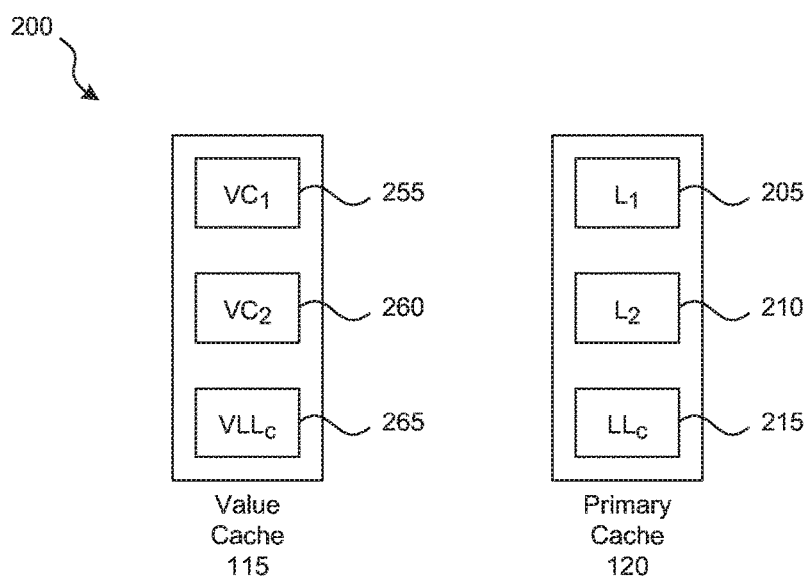
FIG. 2 is a block diagram of hierarchy of a primary cache and value cache of the computer system of FIG. 1, consistent with various embodiments.

The computer system 150 includes (a) a primary cache 120 that caches data, e.g., from the memory 125, based on various caching policies, and (b) a value cache 115 that stores a candidate value from the primary cache 120 in a compact and/or compressed form. A read and/or write latencies of the primary cache 120 are typically lower compared to that of the memory 125. The primary cache 120 can be made up of multiple caches that are organized into various hierarchies an example of which is illustrated in FIG. 2 (described below in detail). In some embodiments, the hierarchy of the value cache 115 is the same as the hierarchy of the primary cache 120, e.g., as illustrated in FIG. 2.

The computer system 150 includes a cache management component 110 that among various other operations manages movement of data between the primary cache 120 and the value cache 115. The cache management component 110 identifies a candidate value in the primary cache 120 that satisfies the criterion for being promoted to the value cache 115 and promotes it to the value cache 115. The criterion can be based on a number of instances or copies of the candidate value being stored in the primary cache 120. For example, the criterion can be that the number of instances of the candidate value stored in the primary cache 120 exceeds a specified threshold. After identifying the candidate value that satisfies the criterion, the cache management component 110 promotes the candidate value to the value cache 115, e.g., stores those multiple instances of the candidate value in the primary cache as a single instance in the value cache 115. Further, the cache management component 110 also evicts those multiple instances of the candidate value from the primary cache 120 after the candidate value is promoted to the value cache 115.

The multiple instances of the candidate value in the primary cache 120 correspond to the candidate value stored at multiple addresses of the memory 125. When the multiple instances of the candidate value is stored as a single instance of the candidate value in the value cache 115, a pointer that is associated with each of these multiple addresses and that points to a location in the value cache 115 at which the single instance is stored is added to the value cache 115. When a data access request is received for the candidate value, a memory address of the candidate value is retrieved from and/or derived from the information in the data access request. If the memory address is present in the value cache 115, the memory address resolves to a specified pointer corresponding to the memory address. The candidate value can be retrieved from the value cache 115 based on the specified pointer, which points to a location in the value cache 115 at which the single instance of the candidate value is stored.

Like promoting a candidate value from the primary cache 120 to the value cache 115, the cache management component 110 can also demote or evict a specified value from the value cache 115 to the primary cache 120 if the specified value ceases to satisfy the criterion for being promoted to or stored at the value cache 115.

In some embodiments, the cache management component 110 can execute a read request for a candidate value at both the primary cache 120 and the value cache 115, e.g., simultaneously, in parallel, or in a serial fashion. In some embodiments, the cache management component 110 is made up of multiple components, which perform discrete operations. For example, a first component (not illustrated) in the cache management component 110 can identify the multiple instances of the candidate value in the primary cache 120. A second component (not illustrated) can promote the candidate value to the value cache 115, and a third component (not illustrated) can serve a read request for the candidate value by obtaining the candidate value from the value cache 115.

In some embodiments, the value cache 115 is not a separate hardware from that of the primary cache 120. The cache management component 110 can allocate a portion of the primary cache 120 for forming the value cache 115.

FIG. 2 is a block diagram of hierarchy 200 of a primary cache and value cache of the computer system of FIG. 1, consistent with various embodiments. The primary cache 120 can be made of multiple caches. For example, the primary cache 120 can include a first level cache "L1" 205, a second level cache "L2" and a third level cache 215 as the last level cache "LLC." In some embodiments, all these caches can be on-chip caches. Typically, the "lower-level" caches (e.g., L1 cache 205) have a smaller number of blocks, smaller block size, and fewer blocks in a set, but have very short access times compared to "higher-level" caches (e.g., L2 210 and above). The higher-level caches have progressively larger numbers of blocks, larger block size, more blocks in a set, and relatively longer access times, but are still much faster than the memory 125. Cache-entry replacement policy is determined by a caching policy selected. That is, data is propagated from the memory 125 to these different levels based on caching policies.

The value cache 115 typically has the same hierarchy as the primary cache 120. For example, the value cache 115 has a first level cache "VC1" 255 that has similar properties as that of L1 205, a second level cache "VC2" 260 that has similar properties as that of L2 260, and a third level cache "VLLC" 265 that has similar properties as that of LLC 215.

Figure 3:
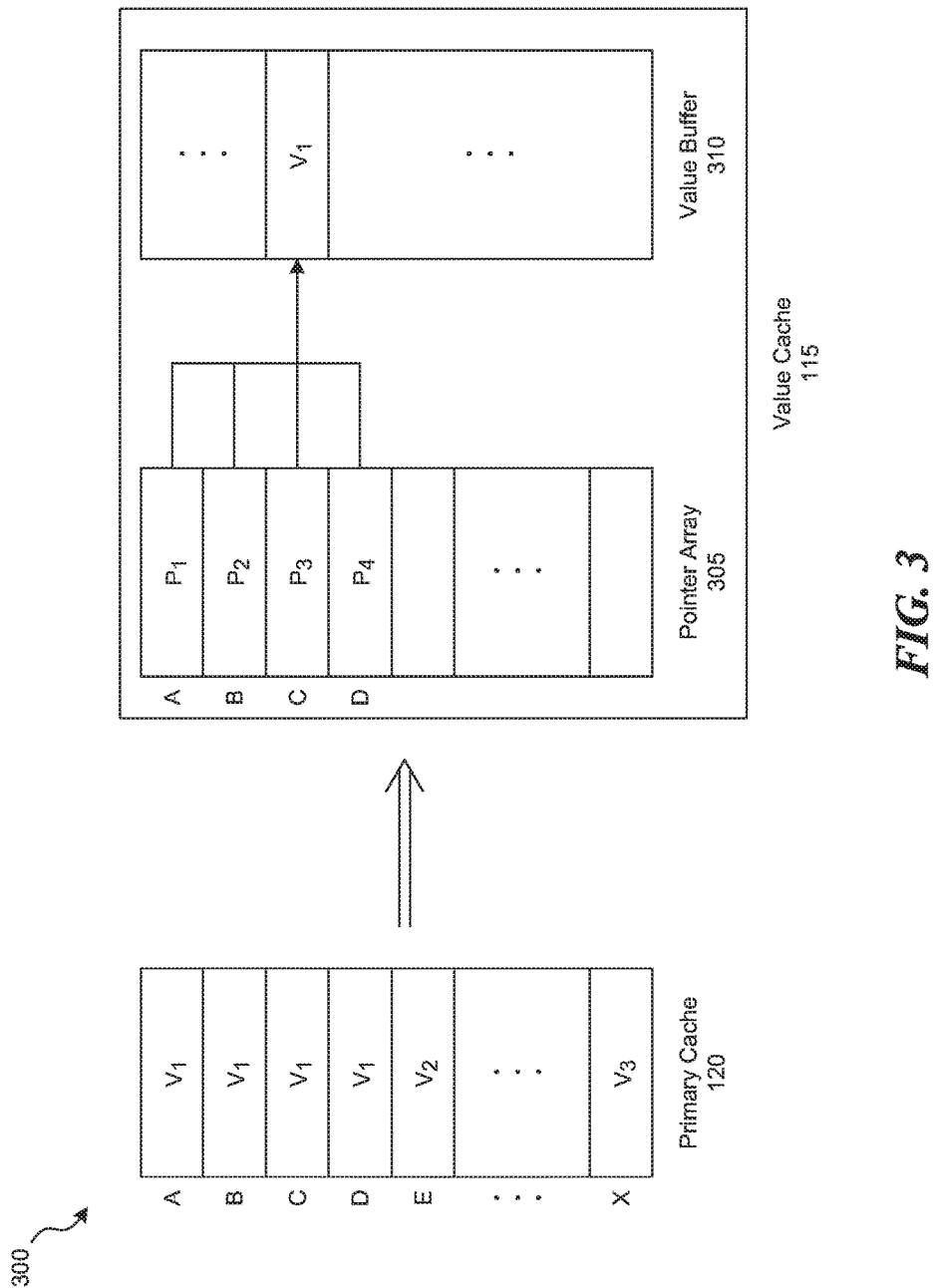
FIG. 3 is a block diagram illustrating an example movement of data between the primary cache and the value cache, consistent with various embodiments.

FIG. 3 is a block diagram of an example 300 illustrating movement of data from the primary cache to the value cache, consistent with various embodiments. In the example 300, the primary cache 120 stores multiple instances of a first value "v1," a second value "v2" and a third value "v3." Consider that the criterion for promoting a value from the primary cache 120 to the value cache 115 is number of instances of a value exceeding three. Accordingly, the cache management component 110 determines that the first value, "v1," which occurs four times in the primary cache 120, satisfies the criterion for being promoted to the value cache 115. In some embodiments, the criterion can be set by a user. The cache management component 110 promotes the first value to the value cache 115, e.g., by storing a single instance of the first value in the value cache 115.

In some embodiments, the value cache 115 includes a value buffer 310 in which values can be stored. In some embodiments, the value buffer 310 is an array data structure. When the first value is promoted to the value cache 115, the first value is stored in the value buffer 310. Further, a number of pointers associated with the memory addresses, e.g., "A," "B," "C," and "D" storing the first value, and each of which points to a location in the value buffer 310 that stores the first value is also stored in the value cache 115, e.g., in a pointer array 305. After the first value and the corresponding pointers to the first value are stored in the value cache 115, the cache management component 110 evicts the multiple instances of the first value from the primary cache 120, thereby making storage space available for storing more number of distinct values in the primary cache 120.

By storing a number of pointers to a single instance of a specified value rather than storing multiple instances of the same value, the amount of storage space consumed in storing a given set of data is minimized as the storage space consumed in storing a pointer is lesser compared to that consumed in storing a copy of the value. Further, more number of distinct values can be stored in a primary cache of a given size as at least some of the duplicate values are promoted to the value cache 115. That is, the available storage space in the primary cache 120 is maximized for storing more number of distinct values.

When a data access request is received, the cache management component 110 retrieves or otherwise derives the memory address from the data access request, resolves the memory address to a specified pointer in the pointer array 305 and obtains the value from the value buffer using the specified pointer. As mentioned above, the value cache 115 and the primary cache 120 are exclusive to each other, e.g., a candidate value can be stored in either the value cache 115 or the primary cache 120.

Figure 4:
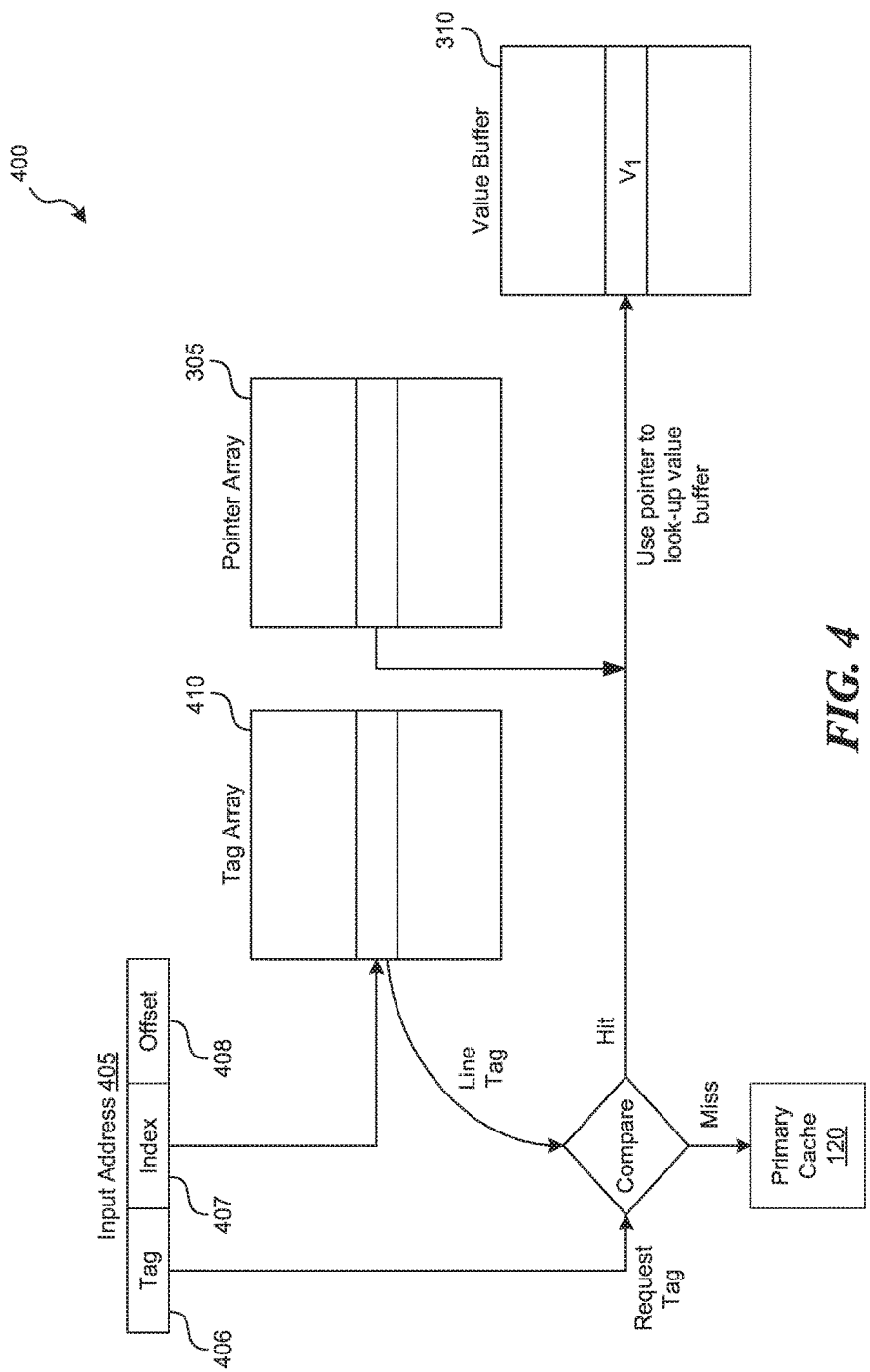
FIG. 4 is a block diagram illustrating an example of executing a data access request in the value cache of FIG. 1, consistent with various embodiments.

FIG. 4 is a block diagram illustrating an example 400 of executing a data access request in the value cache of FIG. 1, consistent with various embodiments. When a data access request is received at the computer system 150, the processor 105 forwards the request to the cache management component 110. The cache management component 110 retrieves or otherwise derives the memory address, e.g., input address 405, at which the data is to be accessed from the data access request. In some embodiments, the processor 105 may itself retrieve or otherwise derive the input address 405 from the data access request and forward it to the cache management component 110. The input address 405, which is of a particular bit length, can be divided into three portions, a tag 406, an index 407 and an offset 408 all of which together represent the specified memory address. Each of the three portions can be of one or more bits. In some embodiments, the tag 406 is a unique identifier for a group of data. Because different regions of the memory 125 may be mapped into a cache line of the primary cache 120, the tag 406 is used to differentiate between them. The cache line can be a basic unit for cache storage and can store multiple bytes or words of data. The index 407 can indicate at which cache line the data has been stored. The offset 408 can indicate the offset of the data stored in the cache line indicated by the index. A tag array 410, which can be an array data structure, has as many rows as the number of cache lines of the primary cache 120, and each row typically stores the tags of the data stored in the corresponding cache line.

To determine whether the input address 405 exists in the value cache 115, the cache management component 110 indexes into the tag array 410 to a specified row corresponding to the index 407 and obtains the tag stored in the specified row. The cache management component 110 then compares the tag 406 in the input address with the tag retrieved from the specified row. If there is a hit, e.g., the tag in the specified row matches the tag 406, the cache management component 110 retrieves a specified pointer from the pointer array 305 stored at a location corresponding to the matched tag. For example, if the matched tag is stored at row 2, then the specified pointer is retrieved from row 2 and offset 408 in row 2 of the pointer array 305. Finally, the data stored in the value buffer 310 at a location indicated by the specified pointer is retrieved and returned to the requesting entity.

Referring back to the comparing the retrieved tag with the tag 406, if there is a miss, e.g., the tag in the specified row does not match the tag 406, the cache management component 110 performs a look up in the primary cache 120 for the input address 405. If there is a hit in the primary cache 120, e.g., the input address 405 is available in the primary cache 120, the value is retrieved and returned to the requesting entity. However, if there is a miss in the primary cache 120, the request is serviced by accessing the memory 125.

In some embodiments, the tag array 410 can be shared between the value cache 115 and the primary cache 120. That is, both the value cache 115 and the primary cache 120 can use the tag array to serve the data access requests, e.g., to lookup the data in the corresponding cache. Further, while the data is maintained in a value buffer 310 and accessed using the pointer array 305 in the value cache 115, in the primary cache 120 the data may be stored in a data array and accessed using the tag array 410.

Figure 5:
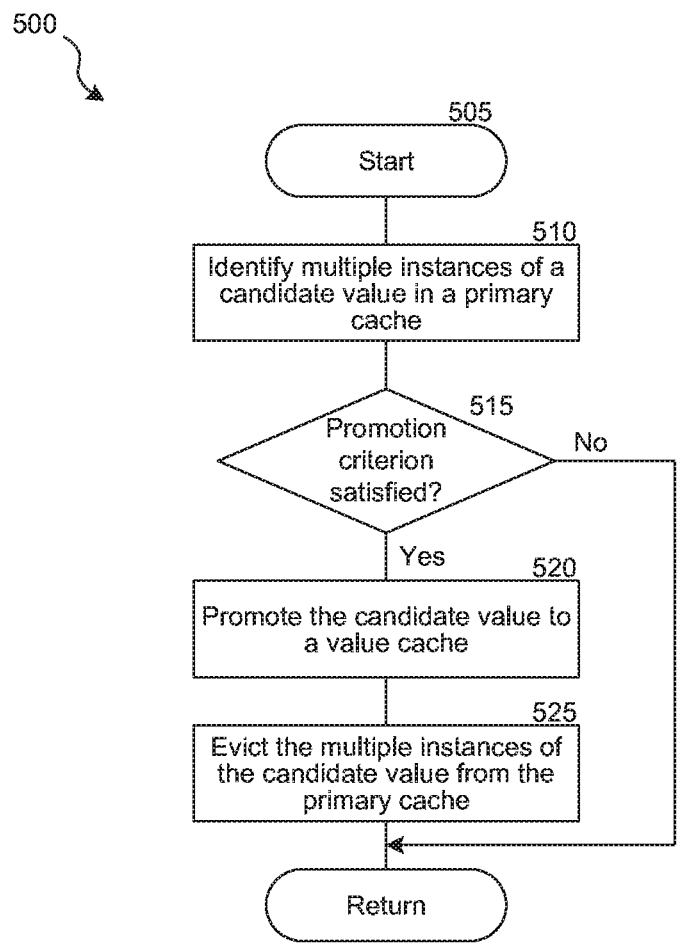
FIG. 5 is a flow diagram of a process for promoting a candidate value to the value cache, consistent with various embodiments.

FIG. 5 is a flow diagram of a process 500 for promoting a candidate value to the value cache, consistent with various embodiments. In some embodiments, the process 500 may be implemented in the environment 100 of FIG. 1. The process 500 begins at block 505, and at block 510, the cache management component 110 identifies multiple instances of the candidate value in the primary cache 120. In some embodiments, the process of identifying can be executed based on a trigger, e.g., whenever a value is updated or written in the primary cache 120, storage consumed in the cache exceeds a specified threshold, expiry of a specified time interval.

At block 515, the cache management component 110 determines if the candidate value satisfies the criterion for promoting the candidate value to the value cache. The criterion can be many, e.g., a number of instances or occurrences or copies of a value exceeding a specified threshold.

At block 520, if the promotion criterion is satisfied, the cache management component 110 promotes the candidate value to the value cache 115 (additional details of which are described at least with reference to FIG. 6 below).

At block 525, the cache management component 110 evicts or deletes the multiple copies of the candidate value from the primary cache 120. In some embodiments, by evicting multiple copies of the same value, the storage space of the primary cache 120 is maximized for caching more number of distinct values for a given cache size, which can improve cache hit ratio and reduce cache pollution and memory bandwidth. In addition, the above process can minimize the need to increase the physical size of the primary cache 120 to store more number of distinct data.

Figure 6:
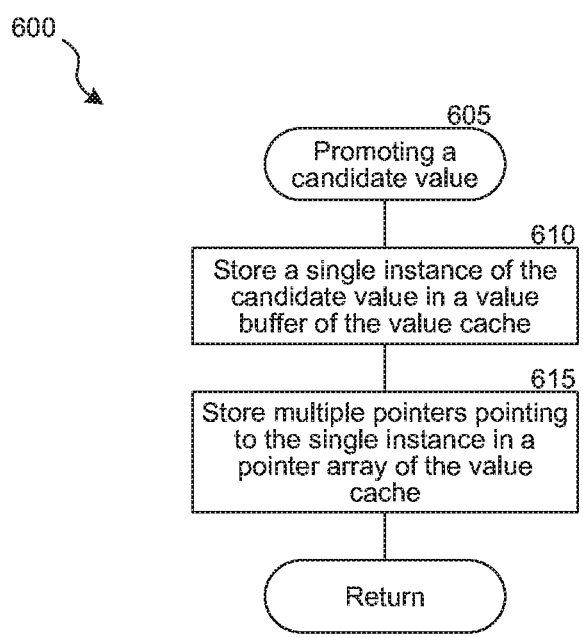
FIG. 6 is a flow diagram of a process for promoting a candidate value to the value cache, consistent with various embodiments.

FIG. 6 is a flow diagram of a process 600 for promoting a candidate value to the value cache, consistent with various embodiments. In some embodiments, the process 600 may be implemented in the environment 100 of FIG. 1, and can be executed as part of block 520 of process 500 of FIG. 5. The process 600 begins at block 605, and at block 610, the cache management component 110 stores a single instance or copy of the candidate value that has been promoted from the primary cache 120 in the value buffer 310 of the value cache 115. At block 615, the cache management component 110 stores multiple pointers to the candidate value stored in the value buffer 310 in the pointer array 305 of the value cache 115. In some embodiments, the cache management component 110 stores as many pointers as the number of copies of the candidate value stored in the primary cache 120. Further, when a data access request is received for a specified memory address, the cache management component 110 can use the specified memory address to identify or determine a pointer in the pointer array 305 that corresponds to the specified memory address, e.g., as described at least with reference to FIG. 4, and access the candidate value in the value buffer 310 pointed to by the pointer.

Figure 7:
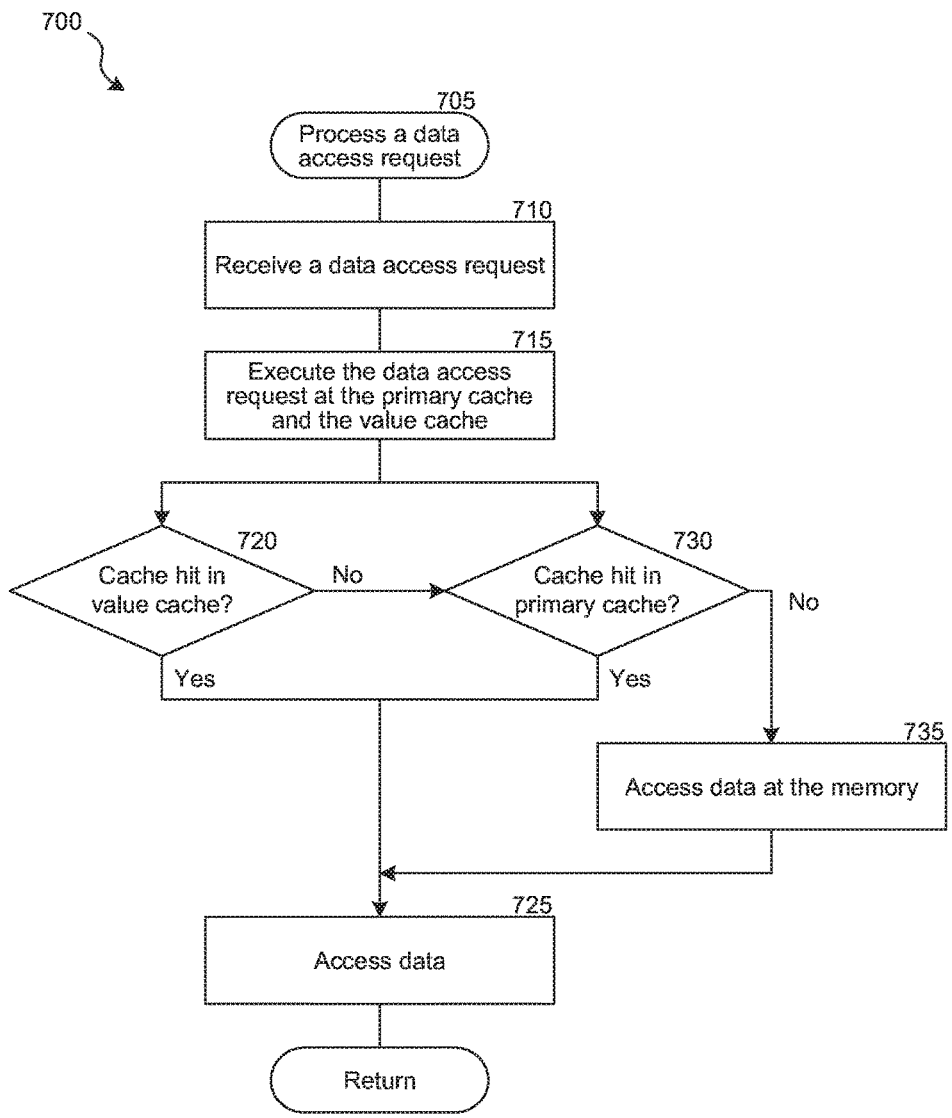
FIG. 7 is a flow diagram of a process for processing a data access request in the computer system of FIG. 1, consistent with various embodiments.

FIG. 7 is a flow diagram of a process 700 for processing a data access request in the computer system of FIG. 1, consistent with various embodiments. The process 700 can be implemented in the environment 100 of FIG. 1. The process 700 starts at block 705, and at block 710, the cache management component 110 receives a data access request. In some embodiments, the data access request can be received by the processor 105 from a client computer system, and the processor 105 can forward the request to the cache management component 110.

At block 715, the cache management component 110 executes the data access request at the value cache 115 and the primary cache 120, e.g., simultaneously, in parallel or in serial. In some embodiments, the cache management component 110 retrieves or otherwise determines, e.g., from the information in the data access request, an input memory address at which the data is to be accessed.

At determination block 720, the cache management component 110 determines whether there is a hit in the value cache 115 for the input memory address. The process of determining whether there is a hit in the value cache 115 is described at least with reference to FIGS. 3 and 4. If there is a hit in the value cache 115, at block 725, the cache management component 110 proceeds to access the data in the value cache 115, e.g., in the value buffer 310, and the process 700 returns.

On the other hand, if there is a miss in the value cache 115, at determination block 730, the cache management component 110 determines whether there is a hit in the primary cache 120 for the input memory address. If there is a hit in the primary cache 120, the cache management component 110 proceeds to access the data in the primary cache 120 at block 725. On the other hand, if there is a miss in the primary cache 120, at block 735, the cache management component 110 proceeds to access the data at the memory 125.

In some embodiments, if the data access request is a read request, the cache management component 110 returns the data accessed at block 725 to the requesting entity. If the data access request is a write/update request, the cache management component 110 performs the write/update and can acknowledge the requesting entity upon completion of the same.

Further, if the data is accessed at the memory 125, e.g., read from and/or written to the memory 125, the cache management component 110 can further store the accessed data in the primary cache 120, e.g., based on a caching policy implemented by the computer system 150. For example, if the caching policy is based on most recently used concept, then the value that is accessed in the memory 125 can be written to the primary cache 120.

Figure 8:
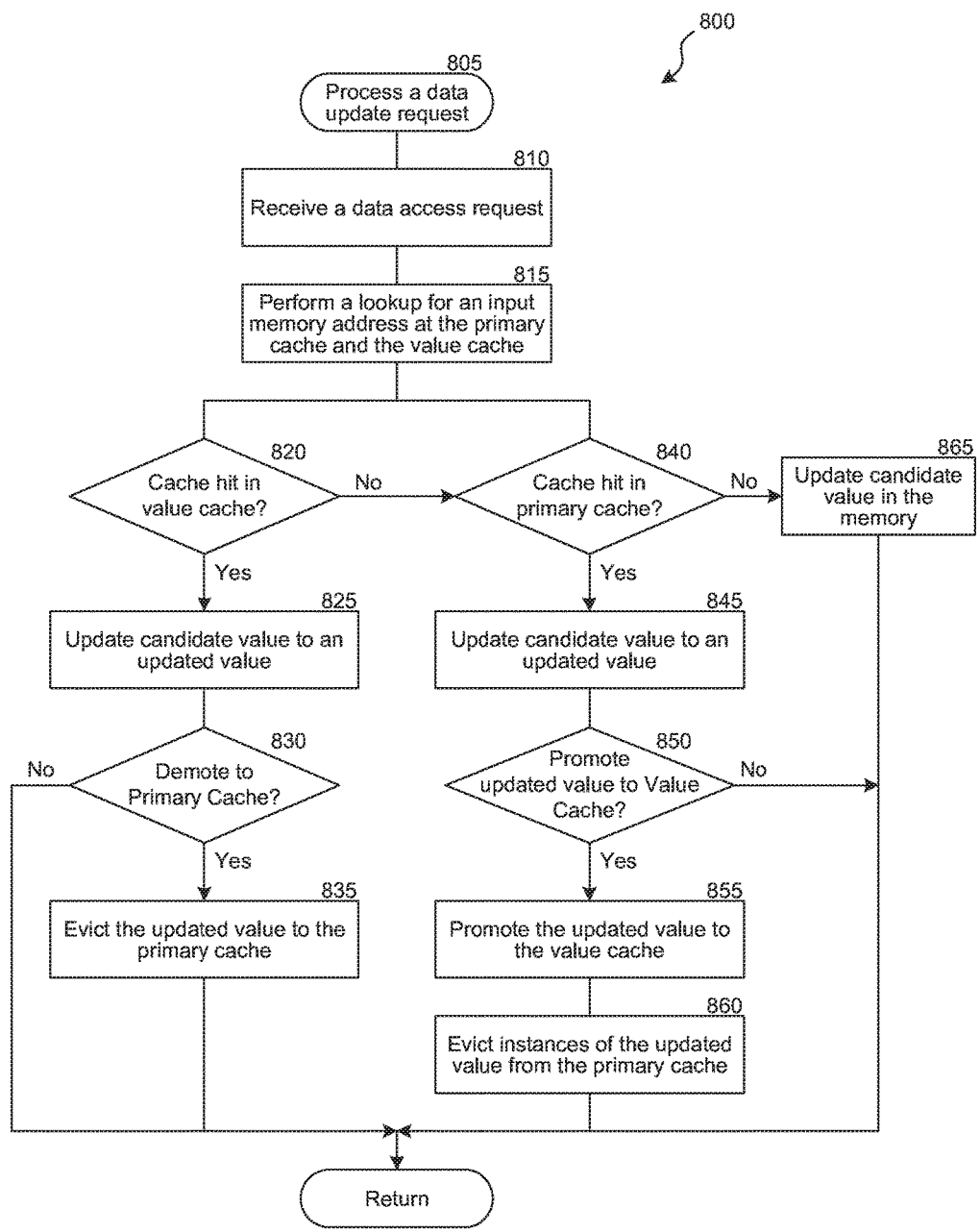
FIG. 8 is a flow diagram of a process for processing a data update request in the computer system of FIG. 1, consistent with various embodiments.

FIG. 8 is a flow diagram of a process 800 for processing a data update request in the computer system of FIG. 1, consistent with various embodiments. The process 800 can be implemented in the environment 100 of FIG. 1. The process 800 starts at block 805, and at block 810, the cache management component 110 receives a data update request. In some embodiments, the cache management component 110 retrieves or otherwise determines, e.g., from the information in the data update request, an input memory address at which the data is to be updated or written. In some embodiments, the processor 105 can forward the input memory address to the cache management component 110. At block 815, the cache management component 110 performs a lookup for the input memory address at the value cache 115 and the primary cache 120, e.g., simultaneously, in parallel or in serial.

At determination block 820, the cache management component 110 determines whether there is a hit in the value cache 115 for the input memory address. The process of determining whether there is a hit in the value cache 115 is described at least with reference to FIGS. 3 and 4. If there is a hit in the value cache 115, at block 825, the cache management component 110 proceeds to update the data in the value cache 115, e.g., in the value buffer 310. After updating the current value to an updated value, e.g., specified by the data update request, at determination block 830, the cache management component 110 determines if the updated value is to be demoted to the primary cache 120. In some embodiments, the updated value is demoted to the primary cache 120 if the criterion for being stored or promoted to the value cache 115 is not satisfied any more. For example, if the number of copies of the updated value falls below the specified threshold for being stored at the value cache 115, then the updated value is evicted from the value cache 115. Consider that the value cache 115 is storing five instances of a candidate value, e.g., "45" of the primary cache 120, in a compressed format, e.g., as a single instance of "45" and multiple pointers, e.g., "5" pointers each corresponding to an instance that was stored in the primary cache 120, pointing to the single instance. Upon updating an instance of the candidate value in the value cache 115, e.g., to "50," the cache management component 110 determines if the updated value "50" satisfies the criterion to be stored in the value cache 115, e.g., if number of instances of the value "50" exceeds the specified threshold for being stored at the value cache 115. If the updated value satisfies the criterion for being stored at the value cache 115, then the updated value is not demoted to the primary cache 120, and the process 800 returns. On the other hand, if the updated value does not satisfy the criterion for being stored at the value cache 115, at block 835, the cache management component 110 evicts the updated value to the primary cache. In some embodiments, the pointer corresponding to the input memory address at which the updated value is stored is also deleted from the value cache 115.

Referring back to determination block 820, if there is a miss in the value cache 115, at determination block 840, the cache management component 110 determines whether there is a hit in the primary cache 120 for the input memory address. If there is a hit in the primary cache 120, at block 845, the cache management component 110 updates the data in the primary cache 120. In some embodiments, after updating the primary cache 120, at determination block 850, the cache management component 110 determines if the updated value is to be promoted to the value cache 115. Consider that a criterion for promoting the candidate value to the value cache 115 is that a number of instances of the candidate value exceeds a specified threshold, e.g., "4." Further, consider that the primary cache 120 stores four instances a value, e.g., "45." Upon updating an instance of the candidate value in the value cache 115, e.g., from "50" to "45," the number of instances of the value "45" increases to "5" and therefore, the updated value "45" satisfies the criterion for being promoted to the value cache 115. Accordingly, at block 855, the cache management component 110 promotes the updated value to the value cache 115 if the updated value satisfies the criterion, and at block 860, evicts the instances of the updated value from the primary cache. If the updated value does not satisfy the criterion for being promoted to the value cache 115, the process 800 returns from determination block 850.

Referring back to determination block 840, if there is a miss in the primary cache 120, at block 865, the cache management component 110 proceeds to update the data at memory 125.

FIG. 9 is a block diagram of a computer system as may be used to implement features of the disclosed embodiments. The computing system 900 may be used to implement any of the entities, components, modules, systems, or services depicted in the examples of the foregoing figures (and any other entities described in this specification). The computing system 900 may include one or more central processing units ("processors") 905, memory 910, input/output devices 925 (e.g., keyboard and pointing devices, display devices), storage devices 920 (e.g., disk drives), and network adapters 930 (e.g., network interfaces) that are connected to an interconnect 915. The interconnect 915 is illustrated as an abstraction that represents any one or more separate physical buses, point to point connections, or both connected by appropriate bridges, adapters, or controllers. The interconnect 915, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 910 and storage devices 920 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media).

The instructions stored in memory 910 can be implemented as software and/or firmware to program the processor(s) 905 to carry out actions described above. In some embodiments, such software or firmware may be initially provided to the processing system 900 by downloading it from a remote system through the computing system 900 (e.g., via network adapter 930).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a specified feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method, comprising:
    identifying, by a computer system and in a primary cache, multiple instances of a candidate value;
    promoting, by the computer system, the candidate value to a value cache of the computer system by storing a single instance of the candidate value in a value buffer associated with the value cache, wherein the value cache is distinct from the primary cache;
    storing, by the computer system, multiple instances of a pointer to the candidate value in a pointer array data structure associated with the value cache, wherein a number of the instances of the pointer is the same as the number of instances of the candidate value in the primary cache; and
    evicting, by the computing system, the multiple instances of the candidate value from the primary cache.

2. The computer-implemented method of claim 1 further comprising:
    receiving a read request at the computer system;
    retrieving a memory address to be read from the read request;
    performing, in parallel, a lookup in both the primary cache and the value cache for the memory address; and
    retrieving a specified value associated with the memory address from either the primary cache or the value cache.

3. The computer-implemented method of claim 2, wherein retrieving the specified value includes:
    confirming a hit in the value cache for the memory address, and
    retrieving the specified value from value cache.

4. The computer-implemented method of claim 2, wherein retrieving the specified value includes:
    confirming a miss in the value cache for the memory address, and
    retrieving the specified value from the primary cache or a memory of the computer system.

5. The computer-implemented method of claim 4, wherein retrieving the specified value includes:
    confirming a hit in the primary cache for the memory address, and
    retrieving the specified value from the primary cache.

6. The computer-implemented method of claim 4, wherein retrieving the specified value includes:
    confirming a miss in the primary cache for the memory address, and
    retrieving the specified value from the memory.

7. The computer-implemented method of claim 1, wherein serving the read request includes:
    retrieving an input memory address from the read request, the retrieving including retrieving an input tag, an input index and an input offset of the input memory address,
    determining a cache hit in the value cache for the input memory address, the cache hit occurring in an event the input tag matches a specified tag stored in a specified row of a tag array associated with the value cache, the specified row determined based on the input index,
    retrieving a specified pointer from the pointer array based on the input index and the input offset portion, and
    retrieving the candidate value from the value buffer based on the specified pointer.

8. The computer-implemented method of claim 7, wherein determining the cache hit includes:
    identifying, using the input index, the specified row in the tag array, the tag array including multiple rows, the rows storing a second portion of memory addresses of values stored in the value cache,
    comparing the input tag with the specified tag stored in the specified row,
    confirming the cache hit in an event the input tag matches the specified tag.

9. The computer-implemented method of claim 1 further comprising:
    serving, by the computing system, a read request for the candidate value from the value cache.

10. The computer-implemented method of claim 1 further comprising:
    updating, in response to receiving an update request, a value associated with a specified memory address in the primary cache to a specified value;
    determining that, in response to the updating, a number of instances of the specified value in the primary cache has met a criterion for promotion to the value cache; and
    promoting the specified value to the value cache by writing a single instance of the specified value to a specified location in the value buffer and storing a number of pointers to the specified location in the pointer array, the number of pointers corresponding to the number of instances of the specified value.

11. The computer-implemented method of claim 1 further comprising:

receiving an update request to update a specified instance of the candidate value in the value cache to a specified value, the specified value being different from the candidate value;

updating a specified memory address associated with the specified instance of the candidate value to the specified value;

evicting the specified instance from the value cache; and adding the specified value to the primary cache based on cache replacement policy associated with the primary cache.

12. The computer-implemented method of claim 1, wherein evicting the specified instance includes deleting a specified pointer associated with the specified instance from the pointer array.

13. The computer-implemented method of claim 1, wherein the primary cache and the value cache are exclusive to each other.

14. The computer-implemented method of claim 1, wherein the value cache is of the same hierarchy as the primary cache.

15. The computer-implemented method of claim 1, wherein identifying the multiple instances of the candidate value includes identifying a value in the primary cache whose number of instances exceeds a specified threshold.

16. A non-transitory computer-readable storage medium storing computer-readable instructions, comprising:

instructions for retrieving a memory address to be read from a read request received at a computer system;

instructions for performing, in parallel, a lookup in both a primary cache and a value cache of the computer system for the memory address, wherein the value cache stores a candidate value from the primary cache in a compressed form by:

storing multiple instances of the candidate value that are in the primary cache as a single instance in the value cache, and evicting the multiple instances of the candidate value from the primary cache; and instructions for retrieving a specified value associated with the memory address from the value cache in an event of a cache hit at the value cache.

17. The computer-readable storage medium of claim 16, wherein the instructions for storing the multiple instances of the candidate value as the single instance include instructions for storing multiple instances of a pointer that points to the single instance in a pointer array of the value cache, wherein a number of instances of the pointer stored is the same as that of the instances of the candidate value.

18. The computer-readable storage medium of claim 16, wherein the value cache is allocated a portion of memory from the primary cache.

19. The computer-readable storage medium of claim 16, wherein the instructions for evicting the multiple instances of the candidate value from the primary cache include instructions for storing distinct values in the primary cache and promoting duplicate values to the value cache.

20. A system, comprising:

a processor;

a first component configured to identify multiple instances of a candidate value in a primary cache;

a second component configured to:
promote the candidate value to a value cache of the computer system by storing a single instance of the candidate value in a value buffer associated with the value cache, wherein the value cache is distinct from the primary cache, store multiple instances of a pointer to the candidate value in a pointer array data structure associated with the value cache, and evict the multiple instances of the candidate value from the primary cache; and a third component configured to serve a read request for the candidate value from the value cache.

* * * * *